United States Patent
Röhr et al.

(10) Patent No.: US 11,441,461 B2
(45) Date of Patent: Sep. 13, 2022

(54) MIXER DEVICE

(71) Applicant: Purem Gmbh, Neunkirchen (DE)

(72) Inventors: Benjamin Röhr, Esslingen (DE);
Herve Tchamgoue, Bad Urach (DE);
Frank Berkemer, Eningen (DE);
Ruben Hass, Stuttgart (DE); Benjamin Deuscher, Stuttgart (DE); Thomas Müller, Breitenbach (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/036,829

(22) Filed: Sep. 29, 2020

(65) Prior Publication Data

US 2021/0115826 A1    Apr. 22, 2021

(30) Foreign Application Priority Data

Oct. 16, 2019   (DE) ..................... 10 2019 127 882.1

(51) Int. Cl.
| | | |
|---|---|---|
| *F01N 3/05* | (2006.01) | |
| *F01N 3/28* | (2006.01) | |
| *B01F 25/431* | (2022.01) | |

(52) U.S. Cl.
CPC ............ *F01N 3/05* (2013.01); *B01F 25/4315* (2022.01); *F01N 3/2892* (2013.01); *F01N 2240/20* (2013.01)

(58) Field of Classification Search
CPC ........ F01N 3/05; F01N 3/2892; F01N 3/2066; F01N 2240/20; F01N 2470/06; B01F 5/0616; F16L 9/18

USPC ..................... 60/324, 317; 138/108, 112–114
See application file for complete search history.

(56) References Cited

U.S. PATENT DOCUMENTS

| | | | |
|---|---|---|---|
| 10,697,347 B1* | 6/2020 | Rohr ..................... | B01F 5/0616 |
| 2013/0333363 A1 | 12/2013 | Joshi et al. | |
| 2015/0113967 A1* | 4/2015 | Baldwin ................. | F01N 13/10 |
| | | | 60/307 |
| 2016/0326938 A1 | 11/2016 | Zhang | |
| 2017/0114693 A1 | 4/2017 | Stelzer et al. | |
| 2017/0260888 A1 | 9/2017 | Solipuram et al. | |
| 2019/0301347 A1* | 10/2019 | Rohr ..................... | F01N 3/2892 |
| 2020/0094202 A1* | 3/2020 | Glanville .............. | B01F 5/0617 |
| 2020/0263590 A1* | 8/2020 | Sauer .................... | F01N 3/2066 |

FOREIGN PATENT DOCUMENTS

| | | |
|---|---|---|
| CN | 204412069 U | 6/2015 |
| CN | 105612325 A | 5/2016 |
| CN | 106121787 A | 11/2016 |
| CN | 106488797 A | 3/2017 |
| CN | 107178406 A | 9/2017 |

(Continued)

*Primary Examiner* — Devon C Kramer
*Assistant Examiner* — Kelsey L Stanek
(74) *Attorney, Agent, or Firm* — McGlew and Tuttle, P.C.

(57) ABSTRACT

A mixer device for an exhaust system of an internal combustion engine includes a tubular carrier (30) enclosing a mixer longitudinal axis (A) in a ring shape configuration and a mixer insert (28) carried at the carrier (30). The mixer insert (28) has a plurality of connection attachments (52, 54, 56) located at spaced locations from one another in relation to the mixer longitudinal axis (A) radially on the outside. The carrier (30) has a plurality of connection recesses (60, 62) for the permanent connection of the mixer insert (28) to the carrier (30).

17 Claims, 2 Drawing Sheets

(56) References Cited

FOREIGN PATENT DOCUMENTS

| | | |
|---|---|---|
| DE | 102018107766 A1 | 10/2019 |
| EP | 3216992 A1 | 9/2017 |
| EP | 3549663 A1 | 10/2019 |

* cited by examiner

MIXER DEVICE

CROSS REFERENCE TO RELATED APPLICATIONS

This application claims the benefit of priority under 35 U.S.C. § 119 of German Application 10 2019 127 882.1, filed Oct. 16, 2019, the entire contents of which are incorporated herein by reference.

TECHNICAL FIELD

The present invention pertains to a mixer device for an exhaust system of an internal combustion engine, by which mixing of a reactant, for example, of a urea/water solution, which is injected into the exhaust gas stream of an internal combustion engine, with the exhaust gas is brought about.

TECHNICAL BACKGROUND

Such a mixer device is known from DE 10 2018 107 766 A1. The mixer insert comprises in this prior-art mixer device a plate-like carrier, which is positioned such that it meshes between two exhaust gas pipes adjoining one another, and which is held between the exhaust gas pipes permanently connected (fixed) to one another. The plate-like (plate shape) carrier has radially inwards projecting, U-shaped carrying sections, which extend axially therefrom, into which carrying sections a ring-like (ring shape), radially outer area of a mixer body is hung and to which the mixer body is connected by welding.

SUMMARY

An object of the present invention is to provide a mixer device for an exhaust system of an internal combustion engine, which mixer device can bring about good mixing of exhaust gas and reactant injected into the exhaust gas while having a simple configuration.

This object is accomplished according to the present invention by a mixer device for an exhaust system of an internal combustion engine, comprising a tubular carrier enclosing a mixer longitudinal axis in a ring-shaped manner (with a ring shape configuration) and a mixer insert carried at the carrier, wherein the mixer insert has a plurality of connection attachments located at spaced locations from one another in the circumferential direction radially on the outside in relation to the mixer longitudinal axis and the carrier has a plurality of connection recesses for the permanent connection (fixing) of the mixer insert to the carrier.

The configuration according to the present invention of a mixer device requires a reduced number of components, because the mixer insert with its connection attachments is connected to a tubular carrier without a component mediating the carrying function, and this tubular carrier may be provided, for example, by an exhaust gas pipe. The mixer insert itself may be provided with an ample freedom of configuration concerning its geometry to be provided for the mixing interaction with the exhaust gas stream and it can thus be adapted in an optimized manner to the particular intended field of use.

A simple configuration can be supported by at least some and preferably all connection recesses being arranged at right angles to the mixer longitudinal axis.

It is proposed for a high strength of the connection that at least one connection recess and preferably each connection recess be elongated in the circumferential direction.

Stable meshing of the connection attachments with the connection recesses can be achieved, for example, by at least one connection recess and preferably each connection recess passing completely through a wall of the carrier.

Further, stable integration of the mixer insert into the tubular carrier can be guaranteed by the mixer insert being connected to the carrier by connection in substance, preferably by welding, in the area of at least one connection attachment and preferably of all connection attachments.

In order to achieve a tight closure against the escape of exhaust gas, it is proposed that each connection recess passing completely through the wall of the carrier and providing a connection to a connection attachment be sealed in a gastight manner by the connection in substance.

In one embodiment, which can be manufactured in an especially simple and cost-effective manner and is nevertheless resistant to exhaust gases and high temperatures, the mixer insert can be configured as a shaped sheet metal part with a mixer body and with the connection attachments projecting from the mixer insert radially on the outside.

In order to make it possible to insert the mixer insert into the tubular carrier in a simple manner, it is proposed that at least one connection attachment and preferably each connection attachment comprise a first attachment section, which is in contact with the carrier and which covers at least one connection recess in the carrier. This makes it possible, especially when the mixer insert is configured as a shaped sheet metal part, to deform this mixer insert in the area of the connection attachments during the insertion into the carrier.

If provisions are further made in this connection for at least one connection section to comprise a second attachment section, which connects the first attachment section of said connection section to the mixer body and which extends at a radially spaced location from the carrier, it is possible for the mixer insert to expand during exposure to heat, while the connection attachments undergo deformation, especially in the area of every other attachment section, without being hindered in the process by connection attachments that are in contact with the carrier and thus hinder a movement.

Provisions may further be made for at least one connection section not to have a second attachment section, i.e., to be configured without such a second attachment section, so that the first attachment section of such a connection attachment extends essentially such that it starts essentially directly from the mixer body. A defined positioning of the mixer body in the carrier is guaranteed in this manner in case of the thermal deformability allowed in the area of other connection attachments configured with a second attachment section.

In order to allow an elastic deformability in the manner of spring tongues in the area of the connection attachments, it is proposed that at least one attachment section and preferably every other attachment section extend starting from the mixer body in the direction of the mixer longitudinal axis and preferably approximately linearly radially outwards.

The mixer insert may have a plurality of exhaust gas passage openings or/and may be configured such that it does not completely cover with its outer circumferential contour an inner cross-sectional area of the carrier. Further, the mixer insert may have deflection surface areas that are arranged offset in relation to one another in the direction of the mixer longitudinal axis and oriented approximately at right angles or at an angle in relation to the mixer longitudinal axis.

The present invention further pertains to an exhaust system for an internal combustion engine, comprising a mixer device configured according to the present invention.

In a configuration of an exhaust system, which configuration can be prepared in an especially simple manner, the carrier may be provided by an exhaust gas pipe leading to a catalytic converter device.

The present invention further pertains to a process for manufacturing a mixer device configured according to the present invention, comprising the following steps:
  a) provision of the carrier with the plurality of connection recesses,
  b) provision of the mixer insert with the plurality of connection attachments, and
  c) insertion of the mixer insert into the carrier such that each connection attachment of the mixer insert is positioned such that it covers at least one connection recess of the carrier.

Step a) may comprise the provision of the carrier as a sheet metal pipe. Step b) may comprise the provision of the mixer insert with a mixer body and with the connection attachments projecting radially outwards from the mixer body as a shaped sheet metal part.

It is proposed for a stable connection between the carrier and the mixer insert that step a) comprise the provision of the carrier such that at least some and preferably all connection recesses are arranged in a plane extending at right angles to the mixer longitudinal axis or/and that at least one connection recess and preferably each connection recess be elongated in the circumferential direction or/and that at least one and preferably each connection recess pass completely through a wall of the carrier.

Provisions may be made, especially if the mixer insert is provided as a basically elastically deformable shaped sheet metal part, for at least each connection attachment comprising a first attachment section and a second attachment section to be deformed elastically in step c) starting from a mounting initial position.

The process may further comprise a step d) for connecting the mixer insert by connection in substance to the carrier in the area of at least one connection attachment and preferably of each connection attachment positioned such that it covers one of the connection recesses. It is thus guaranteed that the mixer insert will not become detached from the carrier even when more intense vibrations develop.

To prevent the discharge of exhaust gas, it is proposed that each connection recess covered by a connection attachment and passing completely through the wall of the carrier be sealed in a gastight manner by the connection in substance in step d).

The present invention will be described below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
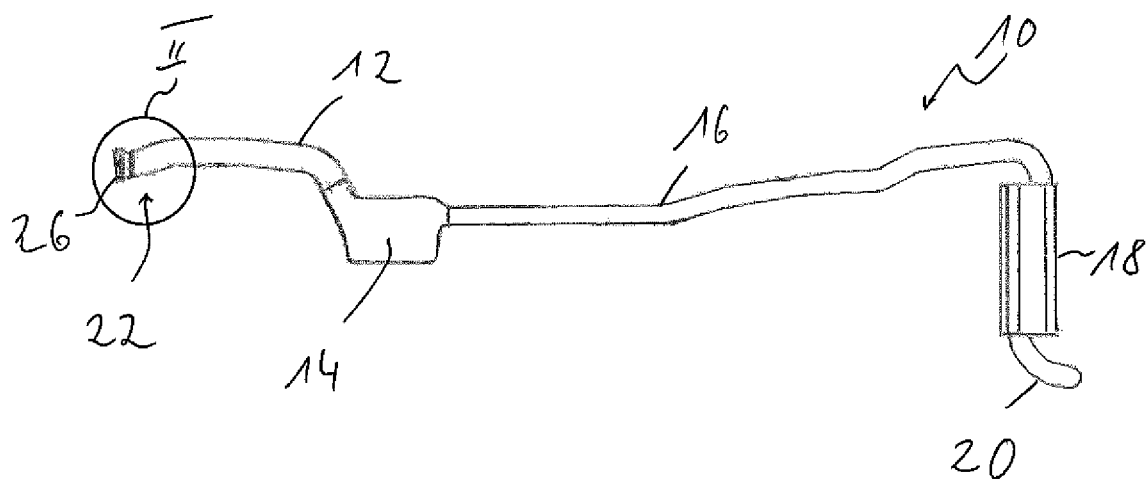
FIG. 1 is a top view of an exhaust system for an internal combustion engine of a motor vehicle.

Referring to the drawings, an exhaust system for an internal combustion engine of a motor vehicle is generally designated by 10 in FIG. 1. Following an exhaust gas pipe 12, which has a one-part or multipart configuration and is jacketed, for example, for an improved thermal insulation, the exhaust system 10 comprises a catalytic converter device 14, especially an SCR catalytic converter device, which is connected to an exhaust muffler 18 via an additional exhaust gas pipe 16. A tail pipe 20, via which the exhaust gas discharged by an internal combustion engine is released into the environment, extends from the exhaust muffler 18.

Figure 2:
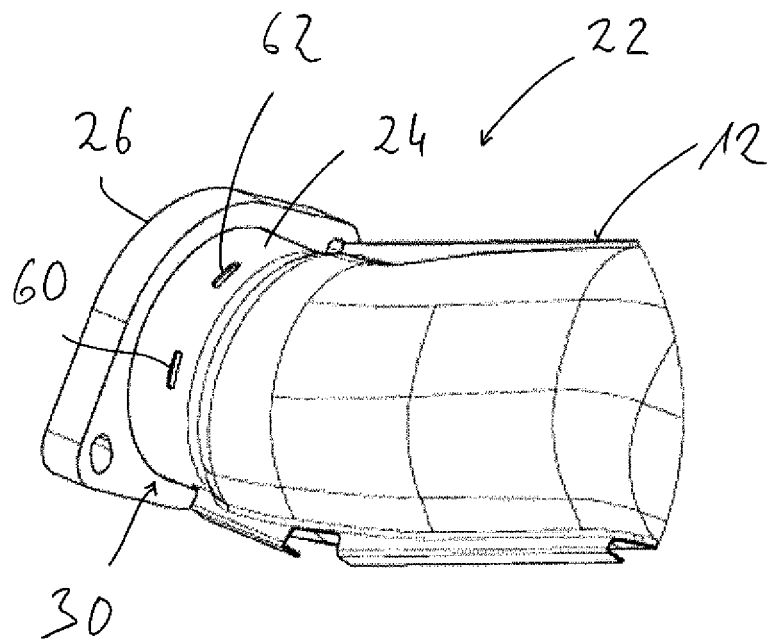
FIG. 2 is an enlarged perspective view showing area II in FIG. 1.

FIG. 2 shows in an enlarged view the end area 22 of the exhaust system 10 and of the exhaust gas pipe 12. A connection flange 26, via which the exhaust gas pipe 12 can be connected to another exhaust gas pipe, which carries, for example, an injector for a reactant, e.g., a urea/water solution, and is not shown in the figures, is connected to an essentially cylindrically shaped end 24 of the exhaust gas pipe 12, for example, by welding. A plate-like mixer insert, which is generally designated by 28, is preferably provided in one piece and is configured as a shaped sheet metal part, is connected in the area of the end 24 of the exhaust gas pipe 12 to the exhaust gas pipe 12, which generally provides a carrier 30 for the mixer insert 28 and forms a mixer device 27 together with the mixer insert 28.

The mixer insert 28 has a mixer body 32, which provides, in general, a saddle-like structure and has deflection surface areas 40, 42, 44, which are oriented approximately at right angles or at an angle in relation to the mixer longitudinal axis A, in a central vertex area 34 extending approximately at right angles to a mixer longitudinal axis A and in deflection areas 36, 38, which are arranged on both sides of the vertex area 34 and are arranged axially offset in relation to this in the downstream direction. A plurality of passage openings 46, through which the exhaust gas arriving at the mixer body 32 can flow, are formed in the mixer body 32. The mixer body 32 is dimensioned such that it does not completely cover the inner cross-sectional area of the exhaust gas pipe 12 in the area of its end 24, so that crescent-shaped passage recesses 48, 50, through which exhaust gas flowing around the mixer body 32 can flow, are formed especially on both sides of the deflection areas 36, 38.

Three connection attachments 52, 54, 56 extend starting from the mixer body 32 in the exemplary embodiment shown. The arrangement is such that the two connection attachments 54, 56 located closer to one another are arranged approximately opposite to the individually arranged connection attachment 52 in relation to the mixer longitudinal axis A. The mixer insert 28 is connected with the connection attachments 52, 54, 56 to the carrier 30, i.e., to the exhaust gas pipe 12 in the manner described below in the area of its essentially cylindrically shaped end 24.

Each connection attachment 52, 54, 56 has a first attachment section 58 extending approximately in the direction of the mixer longitudinal axis A. The first attachment sections 58 of the connection attachments 52, 54, 56 are preferably in contact with the inner circumferential surface of the carrier 30 essentially in the entire area of their axial extension. Since this carrier 30 has a circular inner cross-sectional geometry, the connection attachments 52, 54, 56 may have a rounded configuration adapted to this round cross-sectional geometry in the area of their first attachment sections 58.

In association with each connection attachment 52, 54, 56, a connection recess is provided in the exhaust gas pipe 12 or at the end 24 thereof, FIG. 2 showing the connection recesses 60, 62 associated with the two connection attachments 54, 56 located closer to one another. All the connection recesses 60, 62 associated with the connection attachments 52, 54, 56 are preferably elongated in the circumferential direction and are arranged approximately in a plane extending at right angles to the mixer longitudinal axis A, which means that, for example, the central longitudinal axes of all connection recesses 60, 62 extending in the circumferential direction may be located in a common plane that is at right angles to the mixer longitudinal axis A.

The connection attachments 52, 54, 56 are positioned in the end 24 of the exhaust gas pipe 12 such that they preferably completely cover one of the connection recesses 60, 62. For a permanent connection of the mixer insert 28 to the carrier 30 or to the exhaust gas pipe 12, a respective weld seam 63 is formed in the area of the connection recesses 60, 62, which pass completely through the carrier 30, i.e., a wall of the exhaust gas pipe 12, and which are thus also open outwards, so that the weld material provides a connection in substance of the connection attachments 52, 54, 56 covering the respective connection recesses 60, 62 from the inner side to the carrier 30 and also seals at the same time the connection recesses 60, 62 in a gastight manner.

Figure 3:
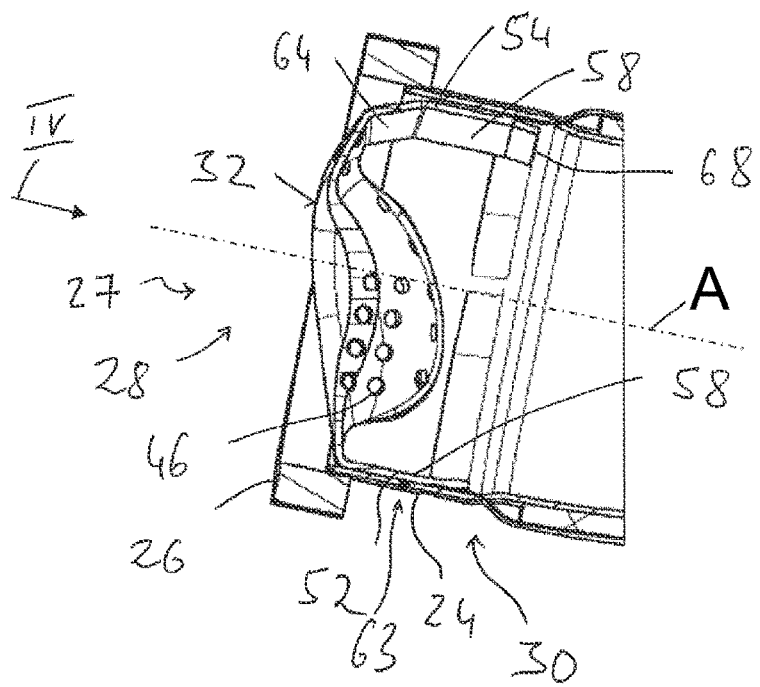
FIG. 3 is a longitudinal sectional view of the end area of the exhaust system of FIG. 1, which end area is shown in FIG. 2.
Figure 4:
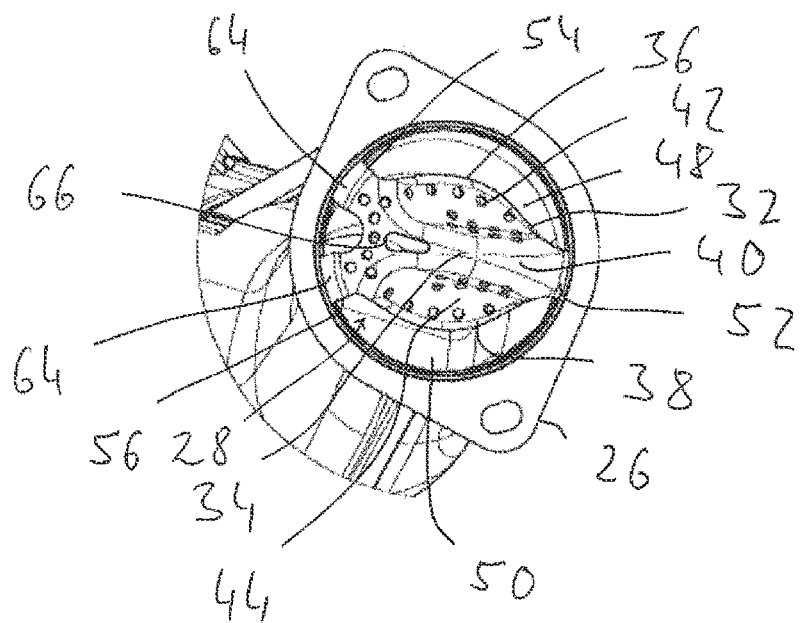
FIG. 4 is an end view showing a view of the area shown in FIG. 2 in viewing direction IV in FIG. 3.

It can be seen in FIG. 3 that while the connection attachment 52 extends with its first attachment section 58 such that it adjoins essentially directly the mixer body 32 radially on the outside, starting from this, approximately in the direction of the mixer longitudinal axis A, a respective second attachment section 64 is provided in the two connection attachments 54, 56 located closer to one another. The second attachment section 64 provides a connection between the respective first attachment section 58 and the mixer body 32. The second attachment section, which preferably extends linearly, i.e., essentially without a curve, extends starting from the mixer body 32 axially in the direction of the mixer longitudinal axis A in the downstream direction and radially outwards, so that every other attachment section 64 extends starting from the mixer body 32 radially outwards obliquely to the end 24 of the exhaust gas pipe 12, i.e., towards the carrier 30, but it has a radially spaced location from the carrier 30 or from the inner circumferential surface thereof. For example, an angle in the range of 5° to 30° may be formed between such a second attachment section 64 and the mixer longitudinal axis. A corresponding angle is then also formed between a respective second attachment section 64 and the cylindrically shaped end 24 of the exhaust gas pipe 12, so that every other attachment section 64 extends radially outwards at a small angle to an exactly parallel direction rather than in an exactly parallel direction in relation to the tubular end 24.

The provision of at least some of the connection attachments 52, 54, 56 with such a second attachment section 64 makes it possible for the mixer body 32 to expand radially in relation to the mixer longitudinal axis A on being heated by the exhaust gas stream, and a deformation of the connection attachments 54, 56 having a respective second attachment section 64 can then compensate this expansion movement of the mixer body 32. Since the individually arranged connection attachment 52 has no such second attachment section, this provides a defined positioning of the mixer body in the inner cross section of the carrier 30, so that it is also ensured that the spray cone of the reactant injected into the exhaust gas stream, which spray cone is directed towards the mixer insert 28, can reach a defined area of the mixer body 32. In particular, this spray cone can be oriented such that it is centered to a slot-like opening 66 in the vertex area 34 of the mixer body 32.

When assembling an exhaust system, the mixer insert 28 is first provided with its mixer body 32 and with the connection attachments 52, 54, 56 starting from this radially on the outside as a shaped sheet metal part. For example, the connection attachments 52, 54, 56 may be shaped now and they may extend in relation to the mixer body 32 such that the first attachment sections 58 will also extend slightly radially outwards. The mixer insert 28 is then inserted axially into the exhaust gas pipe 12 or into the cylindrical end 24 thereof, and bends 68, which are provided at the free ends of the connection attachments 52, 54, 56 and are sloped radially inwards, provide respective lead-in bevels, which ensure that the connection attachments 52, 54, 56, which can be held such that, for example, they are slightly deformed radially inwards during the insertion, can enter into the end 24 and are deformed radially inwards by the lead-in bevels during the insertion into the carrier 30.

The mixer insert 28 is positioned now such that each connection attachment 52, 54, 56 covers a connection recess 60, 62 associated with this. A weld seam is then prepared in the area of each connection recess 60, 62, so that a permanent connection of the mixer insert will develop in the area of its connection attachments 52, 54, 56, on the one hand, and, on the other hand, each of the connection recesses 60, 62 will be gastight sealed (sealed in a gastight manner).

The mixer device configured according to the present invention is characterized by an especially simple configuration, which can be prepared in a simple manner, in which no additional components establishing a load-bearing connection between the mixer insert and the carrier provided by an exhaust gas pipe for the mixer insert are provided. The mixer insert may be provided as a shaped sheet metal part, so that this mixer insert can be prepared easily and in a cost-effective manner, on the one hand, and, on the other hand, it also has a configuration resistant to exhaust gases and reactants and especially also to high temperatures.

The mixer body of the mixer insert can be configured with an ample freedom of configuration concerning its shape, such that it is adapted to the requirements existing for a particular exhaust system in order to provide, on the one hand, a sufficient surface which a reactant introduced as a spray can reach in order to be deflected from this surface and to be mixed in the process with the exhaust gas stream by swirling, and to be evaporated by thermal interaction, on the other hand. Such a mixer device may be provided in a simple manner in any desired areas of an exhaust system in order to make possible the necessary mixing of exhaust gas and reactant especially upstream in relation to an SCR catalytic converter device.

Depending, for example, on the size of the mixer insert, it is also possible to provide more or fewer than three connection attachments with a different distribution in the circumferential direction. It is also possible to provide, in at least one of the connection attachments, at the axial free end of the first attachment section, a radially outwards extending meshing section, which can be positioned such that it meshes with an associated connection recess and can be permanently connected to the carrier by the welding to be performed. Both a defined axial positioning and a defined rotational positioning can be guaranteed in this manner in relation to the carrier prior to the establishment of the connection in substance.

While specific embodiments of the invention have been shown and described in detail to illustrate the application of the principles of the invention, it will be understood that the invention may be embodied otherwise without departing from such principles.

What is claimed is:

1. A mixer device for an exhaust system of an internal combustion engine, the mixer device comprising:
   a tubular carrier enclosing a mixer longitudinal axis with a ring-shaped configuration with a plurality of connection recesses; and
   a mixer insert carried at the carrier, the mixer insert comprising a plurality of connection attachments located at spaced locations from one another in a circumferential direction, radially on an outside in relation to the mixer longitudinal axis, wherein the mixer insert is permanently connected to the carrier at the plurality of connection recesses,
   wherein at least one of the plurality of connection recesses passes completely through a wall of the carrier,
   wherein the mixer insert is connected to the carrier by a connection in substance in an area of at least one of the plurality of connection attachments,
   wherein each connection recess passing completely through the wall of the carrier and providing a connection to a respective one of the connection attachments is gastight sealed by the connection in substance, and
   wherein the mixer insert is shaped as a sheet metal part in one piece.

2. The mixer device in accordance with claim 1, wherein:
   at least part of the plurality of the connection recesses are arranged in a plane and the plane is arranged at right angles to the mixer longitudinal axis; or
   at least one of the connection recesses is elongated in the circumferential direction; or
   at least part of the plurality of the connection recesses are arranged in a plane and the plane is arranged at right angles to the mixer longitudinal axis and at least one of the connection recesses is elongated in the circumferential direction.

3. The mixer device in accordance with claim 1, wherein all of the connection recesses pass completely through the wall of the carrier.

4. The mixer device in accordance with claim 1, wherein the mixer insert is connected to the carrier by the connection in substance in an area of all of the plurality of connection attachments.

5. The mixer device in accordance with claim 4, wherein the connection in substance is formed by welding.

6. The mixer device in accordance with claim 1, wherein at least one of the connection attachments comprises a first attachment section in contact with the carrier and covering at least one of the connection recesses in the carrier.

7. The mixer device in accordance with claim 1, wherein:
   at least one of the connection attachments comprises a first attachment section in contact with the carrier and covering at least one of the connection recesses in the carrier; and
   said at least one of the connection attachments comprises a second attachment section, which connects said first attachment section to the mixer body and extends at a radially spaced location from the carrier.

8. The mixer device in accordance with claim 7, wherein the second attachment section extends, starting from the mixer body in a direction of the mixer longitudinal axis and radially outwards.

9. The mixer device in accordance with claim 1, wherein:
   the mixer insert has a plurality of exhaust gas passage openings; or
   an outer circumferential contour of the mixer insert does not completely cover an inner cross-sectional area of the carrier; or
   the mixer insert has deflection surface areas arranged offset in relation to one another in a direction of the mixer longitudinal axis and oriented approximately at right angles or at an angle in relation to the mixer longitudinal axis.

10. The mixer device in accordance with claim 1, wherein the connection in substance is formed by welding.

11. The mixer device in accordance with claim 1, wherein:
    one of the plurality of connection recesses is completely encircled by a circumferential surface of the tubular carrier.

12. The mixer device in accordance with claim 1, wherein:
    the connection recess is completely gastight sealed by the connection in substance.

13. An exhaust system for an internal combustion engine, the exhaust system comprising:
    an exhaust gas pipe leading to a catalytic converter device; and
    a mixer device comprising:
       a tubular carrier enclosing a mixer longitudinal axis with a ring-shaped configuration with a plurality of connection recesses, the tubular carrier being associated with the exhaust gas pipe or being provided by the exhaust gas pipe; and
       a mixer insert carried at the carrier, the mixer insert comprising a plurality of connection attachments located at spaced locations from one another in a circumferential direction, radially on an outside in relation to the mixer longitudinal axis, wherein the mixer insert is permanently connected to the carrier at the plurality of connection recesses,
    wherein at least one of the plurality of connection recesses passes completely through a wall of the carrier,
    wherein the mixer insert is connected to the carrier by a connection in substance in an area of at least one of the plurality of connection attachments,
    wherein each connection recess passing completely through the wall of the carrier and providing a connection to a respective one of the connection attachments is gastight sealed by the connection in substance, and
    wherein the mixer insert, comprising a mixer body and the connection attachments projecting radially outwards from the mixer body, is shaped as a sheet metal part.

14. The exhaust system in accordance with claim 13, wherein:
    at least part of the plurality of the connection recesses are arranged in a plane and the plane is arranged at right angles to the mixer longitudinal axis; or
    at least one of the connection recesses is elongated in the circumferential direction; or
    at least part of the plurality of the connection recesses are arranged in a plane and the plane is arranged at right angles to the mixer longitudinal axis and at least one of the connection recesses is elongated in the circumferential direction.

15. The exhaust system in accordance with claim 13, wherein all of the connection recesses pass completely through the wall of the carrier.

16. The exhaust system in accordance with claim 15, wherein each connection recess passes completely through the wall of the carrier and provides a connection to a respective one of the connection attachments that is gastight sealed.

17. The exhaust system in accordance with claim 13, wherein the mixer insert is connected to the carrier by the connection in substance an area of at least one of the connection attachments.

\* \* \* \* \*